United States Patent
Getz et al.

(10) Patent No.: US 9,038,571 B1
(45) Date of Patent: May 26, 2015

(54) HAY BALE FEEDER

(71) Applicants: Russell B. Getz, Robesonia, PA (US);
Mary E. Getz, Robesonia, PA (US)

(72) Inventors: Russell B. Getz, Robesonia, PA (US);
Mary E. Getz, Robesonia, PA (US)

( * ) Notice: Subject to any disclaimer, the term of this patent is extended or adjusted under 35 U.S.C. 154(b) by 177 days.

(21) Appl. No.: 13/962,435

(22) Filed: Aug. 8, 2013

(51) Int. Cl.
*A01K 5/01* (2006.01)
*A01K 5/00* (2006.01)

(52) U.S. Cl.
CPC .... *A01K 5/00* (2013.01); *A01K 5/01* (2013.01)

(58) Field of Classification Search
CPC ................................. A01K 1/10; A01K 5/01
USPC ............. 119/58–60, 61.1–61.3, 61.31, 57.92
See application file for complete search history.

(56) References Cited

U.S. PATENT DOCUMENTS

| | | | |
|---|---|---|---|
| 376,529 A | | 1/1888 | Kline |
| 727,925 A | | 5/1903 | Faulkner |
| 1,592,493 A | * | 7/1926 | Kelly ............................... 119/60 |
| 2,735,402 A | * | 2/1956 | DeLorenzo ................ 119/61.31 |
| 3,802,394 A | * | 4/1974 | Mahler ........................ 119/51.5 |
| 4,844,424 A | | 7/1989 | Knudslien |
| 4,976,222 A | | 12/1990 | Cooke |
| 5,509,377 A | | 4/1996 | Franklin |
| 5,586,519 A | * | 12/1996 | Wilkinson ...................... 119/60 |
| 6,006,696 A | | 12/1999 | Mann et al. |
| 7,895,974 B2 | | 3/2011 | Brickell |

\* cited by examiner

*Primary Examiner* — David Parsley
*Assistant Examiner* — Danielle Clerkley
(74) *Attorney, Agent, or Firm* — Robert C. Montgomery; Montgomery Patent & Design, LP

(57) ABSTRACT

A hay bale holder having an enclosure that retains a hay bale within chain link fencing is disclosed. The hay bale holder includes a spring mechanism that causes the chain link fencing to tightly retain the hale bale. Hay can then pass through openings in fencing to allow animals to remove portions of hay from a comfortable height without excessive waste.

20 Claims, 8 Drawing Sheets

HAY BALE FEEDER

RELATED APPLICATIONS

There are no current related applications.

FIELD OF THE INVENTION

The presently disclosed subject matter is directed toward devices for feeding animals. More particularly, the present invention relates to a hay bale feeder that reduces feed waste.

BACKGROUND OF THE INVENTION

Raising animals takes work and money. Among the many other tasks required to raise animal are purchasing animals, transporting them, feeding them, watering them, and ensuring they receive proper veterinary care. Land, labor, energy, and supporting structures are all required.

As noted, animals must be feed. The production of food for either animals or humans is a time consuming, energy intensive activity. Large areas of land must be cultivated and in modern society that requires heavy use of machinery and money. As fuel costs, land costs, seed costs, and labor costs increase so does the price of food. Many animals feed on hay or similar fodder. Over the last few years the price of hay and hay alternatives has gone up rather dramatically. Furthermore, the end of cost increases is not in anticipated any time soon. Thus the cost of hay is anticipated to keep climbing.

Animal raisers are caught in a bind. They need hay but the cost of hay is increasing. But animals need to be properly fed, not too much, but enough. If left to themselves animals waste a lot of feed. Such waste drives up production costs. Furthermore, many animals simply don't like to bend down to obtain food. More marketable animals result if food is presented to them at the proper height.

In view of the foregoing an animal feeding device that feeds hay or hay substitutes to animals with reduced waste would be advantageous. Beneficially such an animal feeding device would present feed to the animals at the proper height for consumption. Preferably such a device would be rugged, simple to use, and last for a long time even in the rough environment of an animal pen. Ideally such an animal feeding device would automatically adjust itself as required to provide feed to animals with reduced waste.

SUMMARY OF THE INVENTION

The principles of the present invention provide for an animal feeding device that feeds hay or hay substitutes to animals with reduced waste. The inventive animal feeder is a hay bale feeder that can present feed to the animals at the proper height for consumption. The hay bale feeder can be configured to be rugged, simple to use, and to withstand the rigors of animal feeding. The hay bale feeder automatically adjusts itself as required to provide feed to animals with reduced waste.

A hay bale feeder that is in accord with the present invention includes an enclosure having a first side panel, a second side panel, an open front trough section, a first floor attached to the bottom of the front trough section, an open rear trough section, a second floor attached to the bottom of the rear trough section, wherein the first side panel and the second side panel are joined at their bottoms to the first floor, wherein the second trough section is connected to the first side panel and to the second side panel, and wherein an extension of the rear trough section from the first side panel and the second side panel is adjustable. An elongated rear frame member joins the upper rear corners of the first side panel and the second side panel together. In addition, a first support tube extends between and connects the first side panel to the second side panel. The first support tube is positioned slightly above the first floor section and towards the front of the enclosure. A second support tube extends between and connects the first side panel to the second side panel. The second support tube is positioned slightly above the first floor section and towards the rear of the enclosure.

In addition, the hay bale feeder includes a laterally extending spring winding mechanism having a hollow shaft with a first shaft end that is supported by a first shaft flange which is attached to the first side panel. The second shaft end is supported by a second shaft flange that is fixed on the second side panel. The spring winding mechanism also includes a torsion spring having a first hook end and a second hook end. The spring extends within the shaft. A hand wheel and a ratchet gear are attached to the first shaft end. A first hook fastener attaches the first hook end to the shaft while a second hook fastener fixes the second hook end to the second shaft flange. A gear pawl selectively mates with the ratchet gear to enable the shaft to selectively turn only one (1) direction. Finally, chain link fencing is fixed at one (1) end to the elongated rear frame member and then selectively attached to the shaft at another end.

Beneficially the first side panel and the second side panel are welded to the first floor. The rear frame member may be made of angle iron. The first side panel and the second side panel preferably include sets of apertures, the rear trough section preferably includes a set of apertures, and the extension is adjusted by aligning the set of apertures in the rear trough section with a selected set of apertures and then passing and tightening fasteners through the aligned apertures.

In practice the hay bale feeder can incorporate safety edging on at least one (1) sharp edge and/or legs that extend from the first floor and the second floor. Beneficially, the legs are "U"-shaped tubes and include leg apertures for receiving spikes. In practice the legs can be made removable.

The chain link fencing is fixed at one (1) end to the elongated rear frame member by pinching the one end between the elongated rear frame member and an attachment bar. The chain link fencing is preferably pinched using threaded fasteners that pass through the elongated rear frame member, fence openings, and the attachment bar.

The chain link fencing is selectively attached to the shaft by pinching the chain link fencing between a second clamping plate and a fencing attachment bar and then attaching the fencing attachment bar to the shaft. The chain link fencing is beneficially pinched using threaded fasteners that pass through the second clamping plate, fence openings, and the fencing attachment bar. In practice the fencing attachment bar may include a plurality of apertures, the shaft may include a plurality of studs, and the fencing attachment bar is then preferably attached to the shaft by inserting the plurality of studs through the plurality of apertures. Beneficially, the fencing attachment bar is angle iron.

In use the hand wheel may be approximately one foot (1 ft.) in diameter and located outside of the enclosure.

A bale of hay may be inside the enclosure. If so, the bale of hay rests on the first support tube while hay extends through the chain link fence.

BRIEF DESCRIPTION OF THE DRAWINGS

The advantages and features of the present invention will become better understood with reference to the following

FIG. 4b is a cut-away view of the winding end of the spring winding mechanism 60 shown in FIG. 4a;

Figure 1:
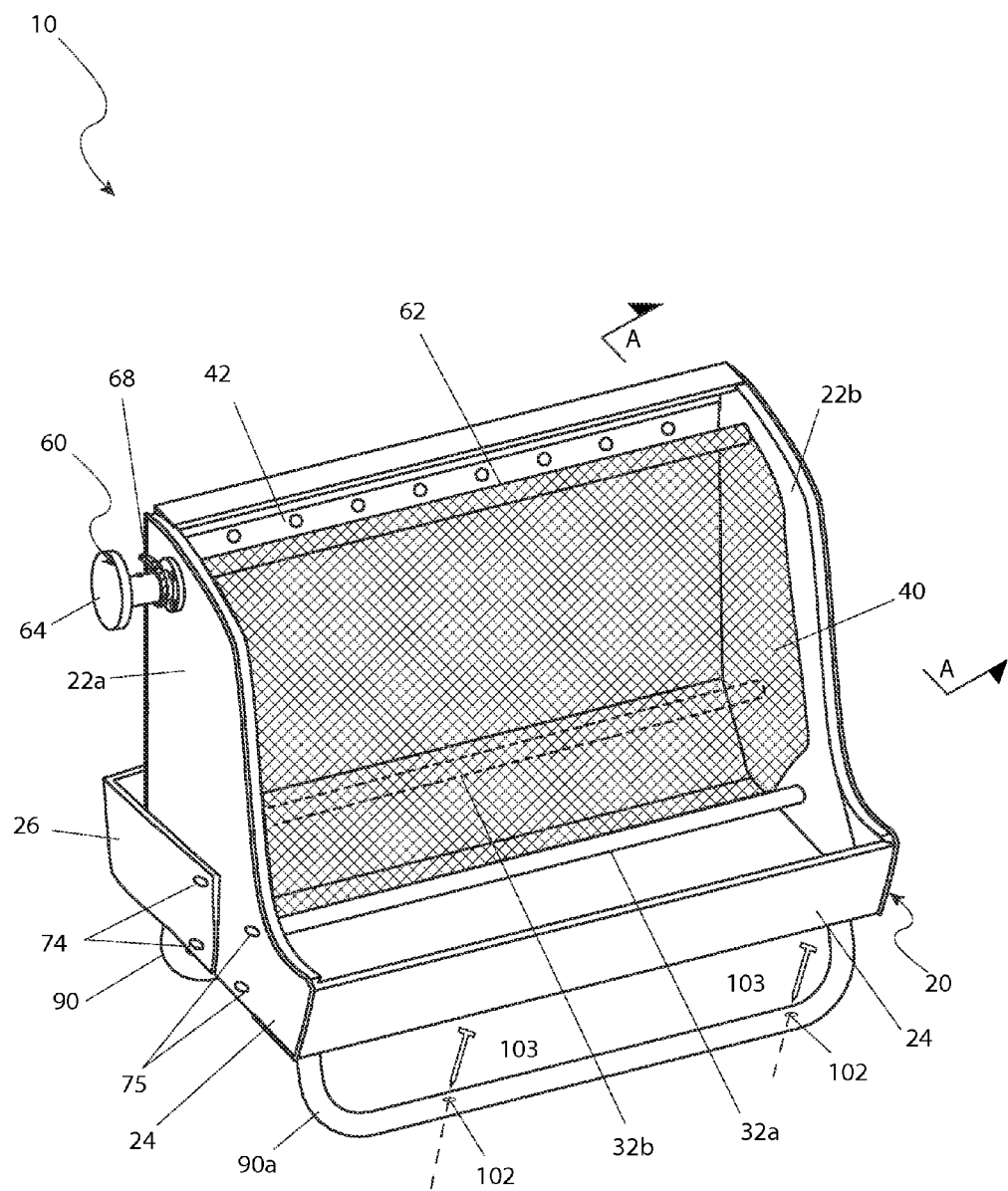
FIG. 1 is a front perspective view of a hay bale feeder 10 that is in accord with a preferred embodiment of the present invention.

DESCRIPTIVE KEY 10 hay bale feeder
20 enclosure
22a first side panel
22b second side panel
24 front trough section
26 rear trough section
28a first floor section
28b second floor section
29 safety edging
30 rear frame
32a first support tube
32b second support tube
40 fencing
42 first clamping plate
60 spring winding mechanism
62 shaft
63 stud
64 hand wheel
66 ratchet gear
68 pawl arm
70 pivot bolt
72 first shaft flange
74 fastener
75 fastener aperture
76 first spring anchor bolt
78a torsion spring
78b first hook-end
78c second hook-end
80 second shaft flange
82 recess feature
84 second spring anchor bolt
90a first leg
90b second leg
91 leg mounting plate
92 fencing attachment bar
93 second clamping plate
94 stud aperture
100 hay
102 leg aperture
103 spike
105 ground/floor surface
110 weld
120 structure

DETAILED DESCRIPTION OF THE PREFERRED EMBODIMENT

Figure 5:
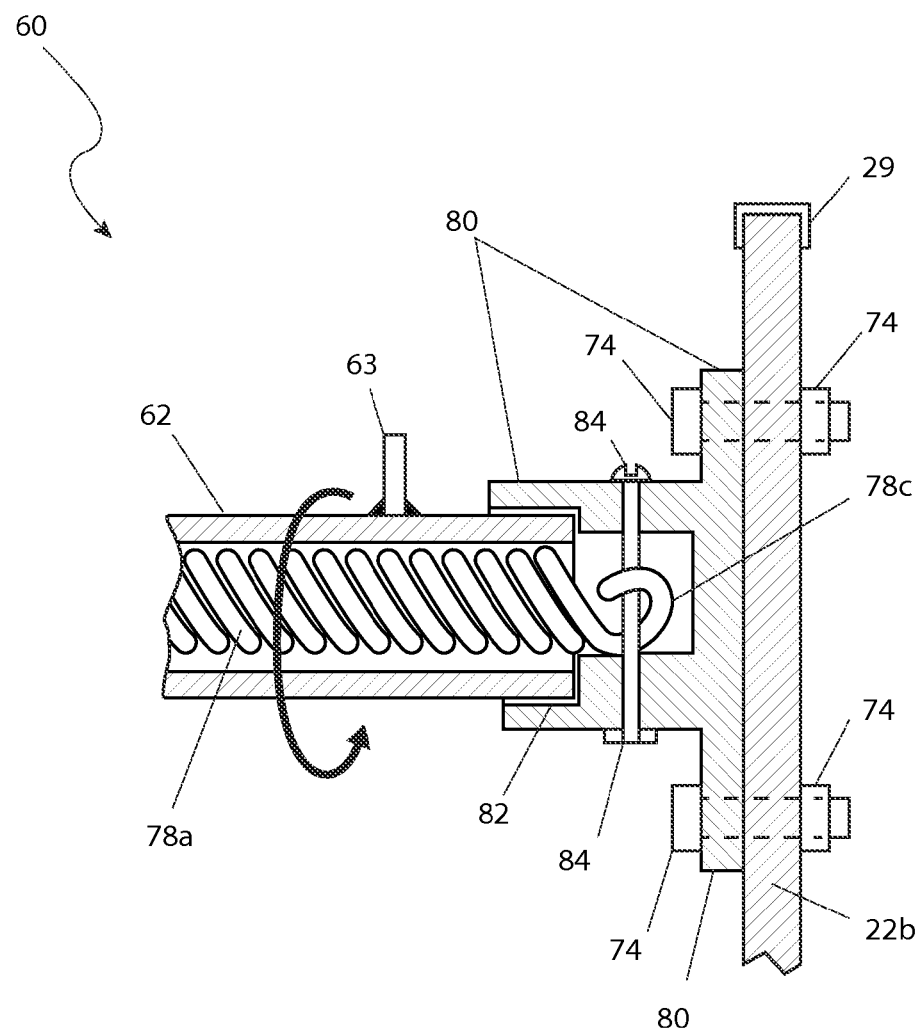
FIG. 5 is a cut-away view of a spring anchor end of the spring winding mechanism 60 shown in FIGS. 4a and 4b.
Figure 6:
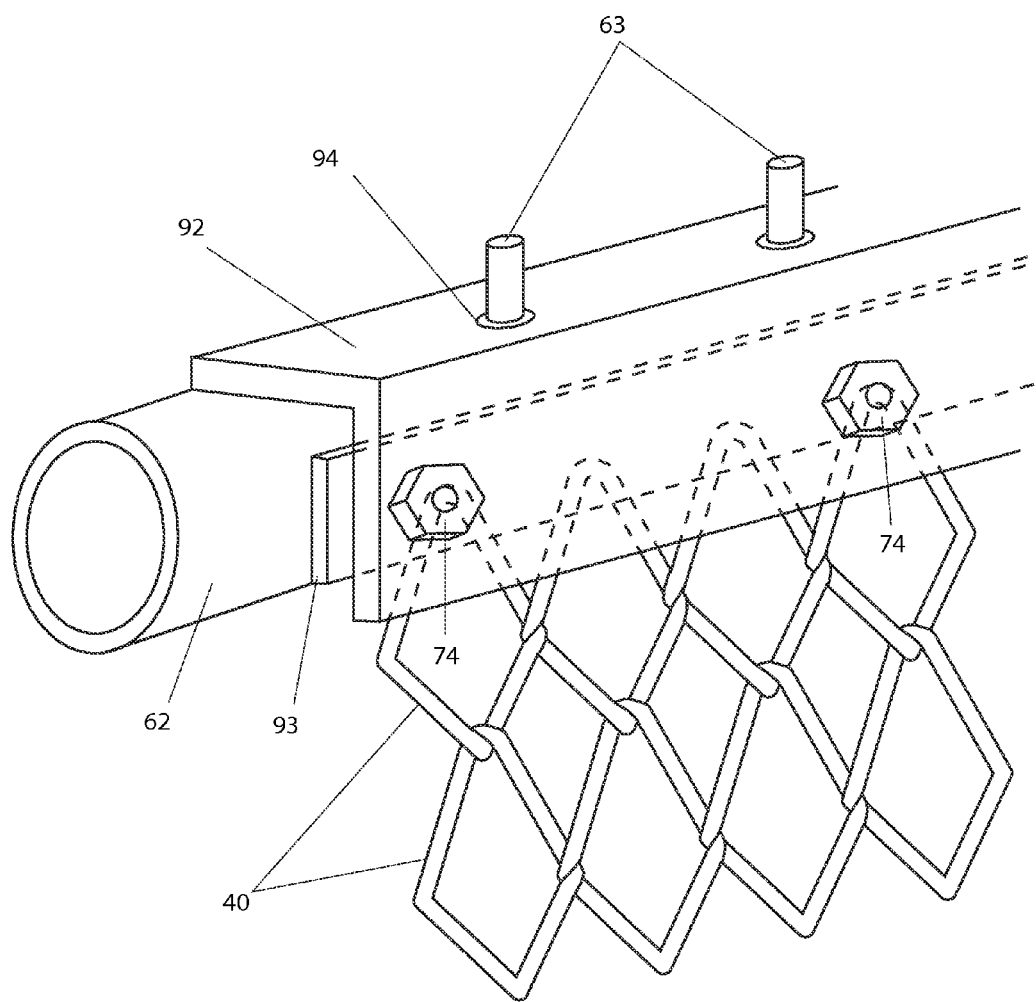
FIG. 6 is a close-up view of a fencing attachment bar 92 used in the hay bale feeder 10 shown in FIGS. 1-3; and, FIG. 7 is a sectional view of the hay bale feeder 10 shown in FIGS. 1-3 optionally affixed to a structure 120.
Figure 7:
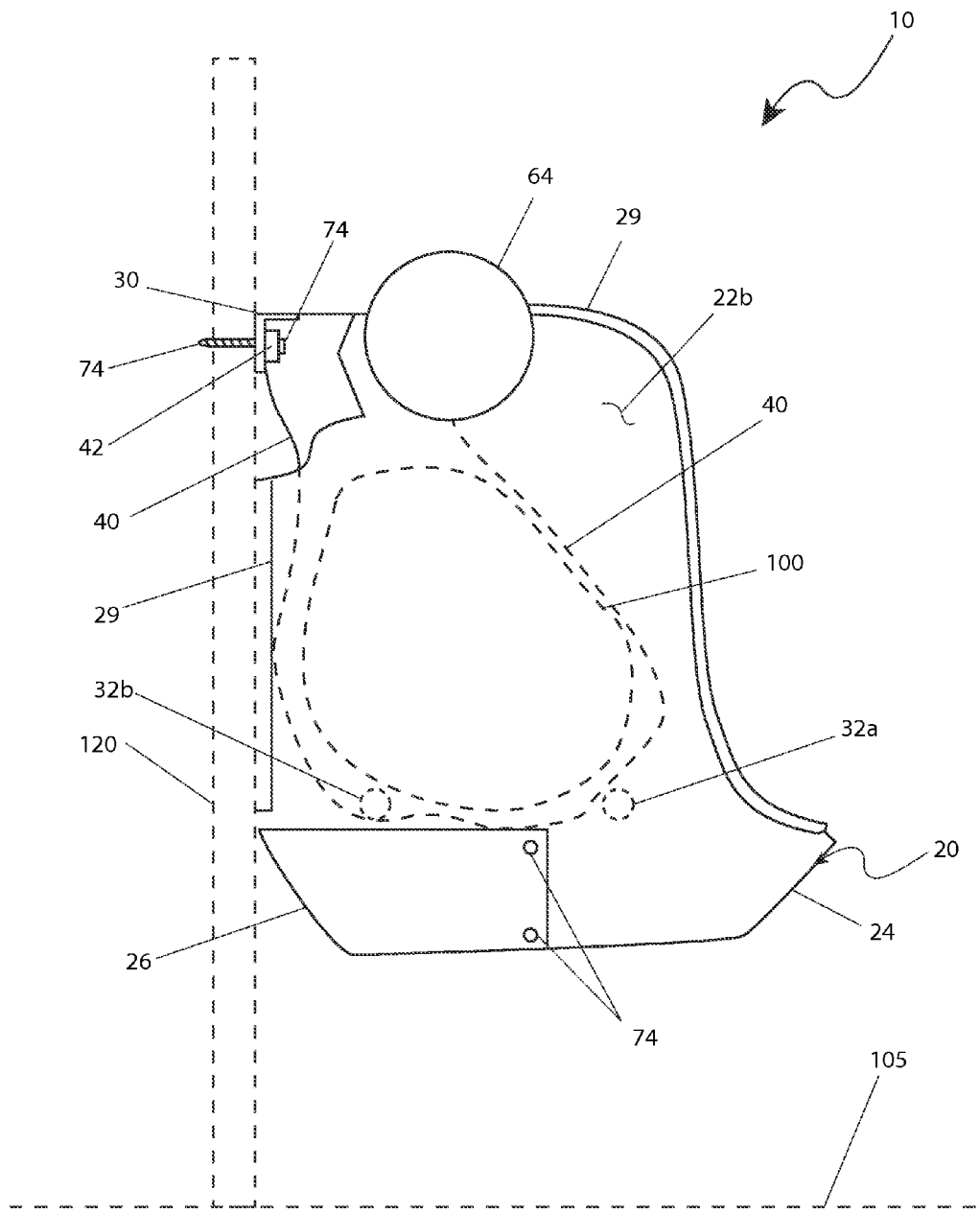

The best mode for carrying out the invention is presented in terms of its preferred embodiment, herein depicted within FIGS. 1 through 6, and supplemented by an alternative installation depicted in FIG. 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 3:
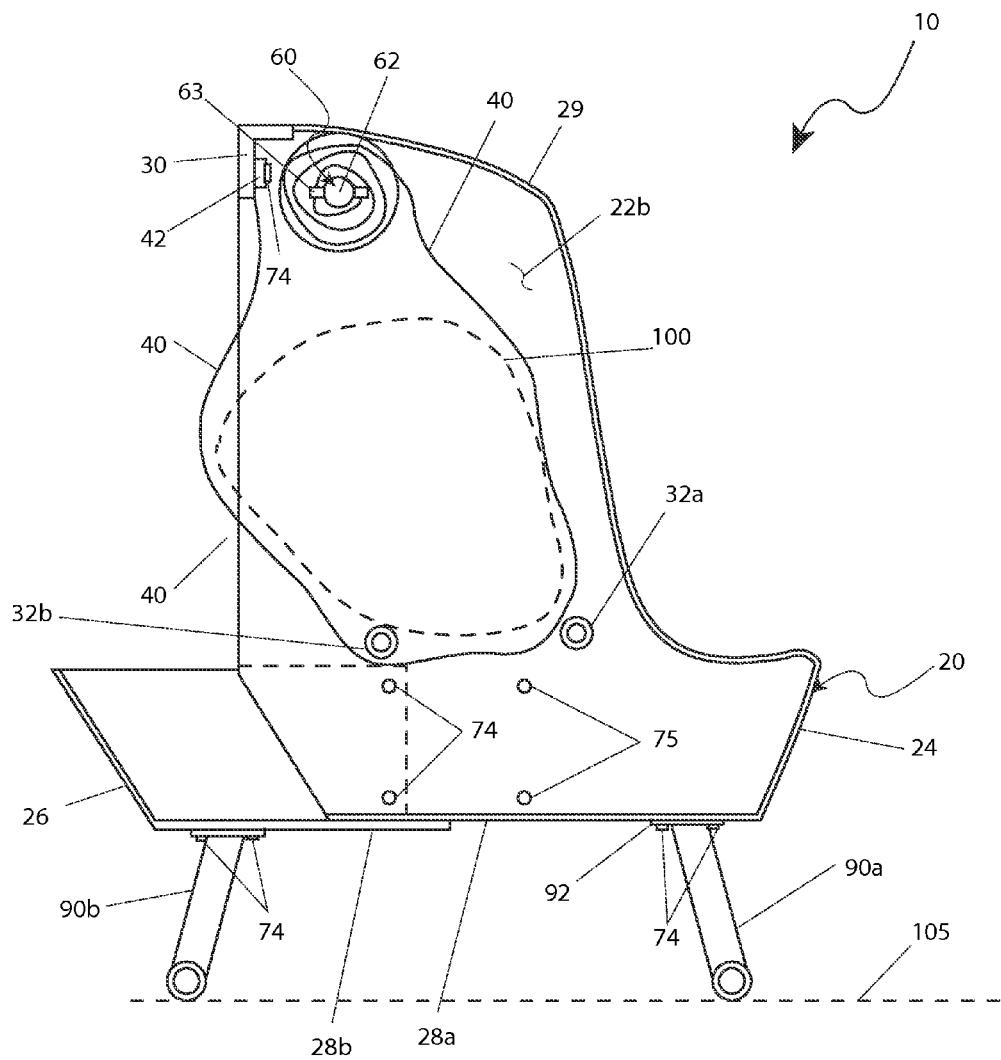
FIG. 3 is a sectional view of the hay bale feeder 10 taken along section line A-A of FIG. 1.

Referring now to FIGS. 1 and 3, the present invention describes a hay bale feeder 10 which encloses and holds a hay bale 100 or bulk hay or similar feed product within chain link fencing 40. Openings in the fencing 40 allow animals to remove feed from the hay bale 100. As is described below, spring tension on the fencing 40 causes the fencing 40 to automatically reduce in diameter as the hay bale 100 is consumed.

Figure 2:
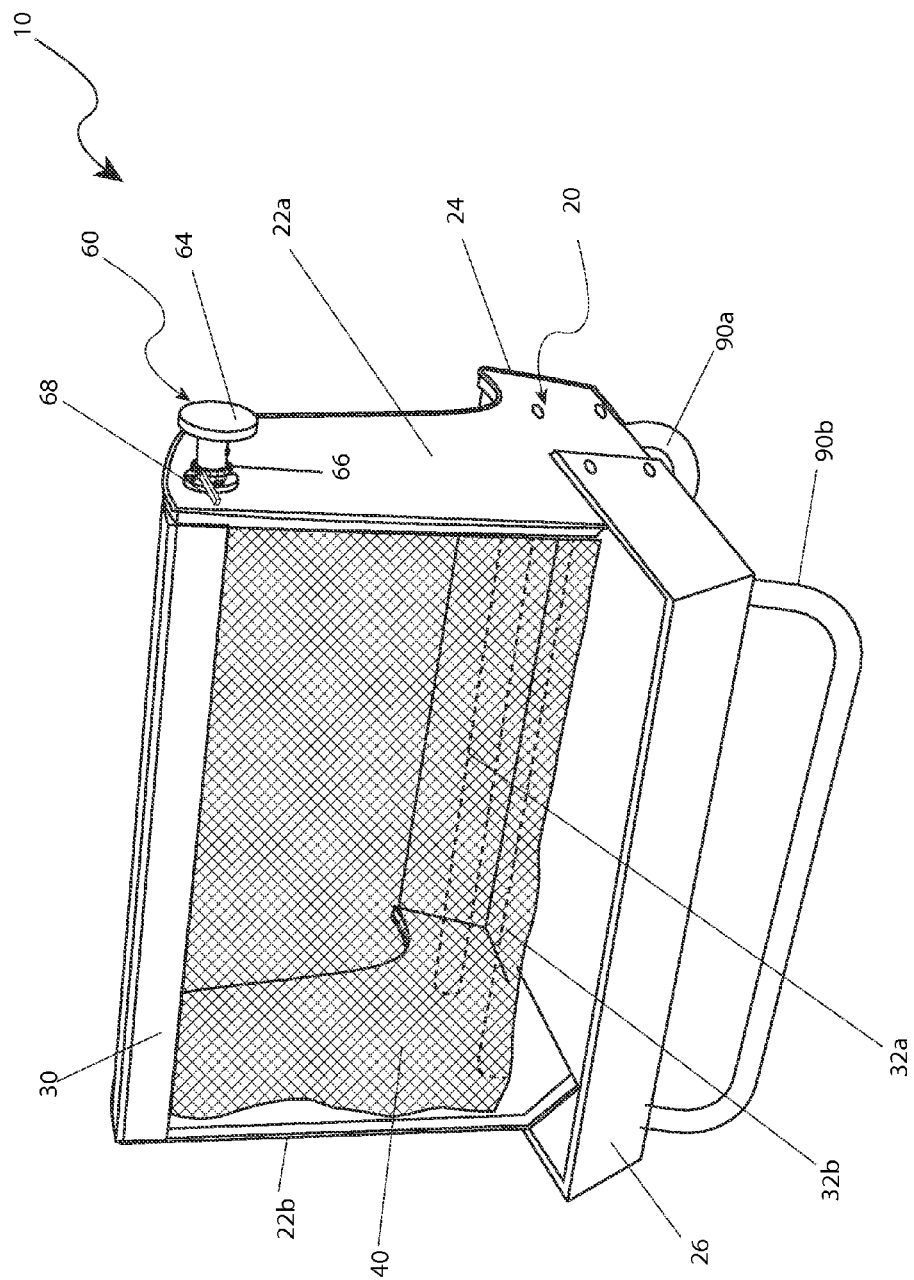
FIG. 2 is a rear perspective view of the hay bale feeder 10 shown in FIG. 1.

Turning to FIGS. 1 and 2, respectively front and rear perspective views of the hay bale feeder 10; the hay bale feeder 10 reduces waste when feeding farm-type animals from the contained hay bale 100. The hay bale feeder 10 includes an enclosure 20 having a first side panel 22a, a second side panel 22b, a front trough section 24, a rear trough section 26, a first floor section 28a (see FIG. 3), and a second floor section 28b (see FIG. 3). The front trough section 24 and the rear trough section 26 are open while the first side panel 22a, the second side panel 22b, the first floor section 28a, and the second floor section 28b are closed.

The first side panel 22a and the second side panel 22b are somewhat rectangular in shape. They are joined along their bottom edges to the first floor section 28a. Joining can be by welds 110 (see FIG. 4b) or other types of fastening. The first side panel 22a and the second side panel 22b are also joined (such as by welds 110) at their upper rear corners to a rear frame member 30. The rear frame member 30 is envisioned as being and angle iron or a similar structural member.

The first side panel 22a and the second side panel 22b are also connected together by an elongated first support tube 32a and by an elongated second support tube 32b. The first support tube 32a and the second support tube 32b are beneficially positioned slightly above the first floor section 28a, and respectively towards the front and rear of the enclosure 20. The first support tube 32a and the second support tube 32b are preferably connected to the first side panel 22a and to the second side panel 22b by welds 110. The first support tube 32a and the second support tube 32b provide structural support for the enclosure 20 and position the hay bale 100 above the first floor section 28a.

The extension of the rear trough section 26 from the first side panel 22a and second side panel 22b is adjustable. This is achieved by attaching the second floor section 28b to rear trough section 26 and under the first floor section 28a. Then, locating sets of fastener apertures 75 through the lower section of the first side panel 22a and second side panel 22b.

Then, locating a set of apertures 75 in the forward sides of the rear trough section 26. Finally, the apertures 75 in the rear trough section 26 are aligned with a selected set of fastener apertures 75 in the first side panel 22a and second side panel 22b and fasteners 74 are passed through the aligned apertures 75 and tightened.

When the enclosure is configured to be deep a pair of legs 90a, 90b is respectively mounted to the first floor section 28a and to the second floor section 28b. Those legs are then spread apart. This increases the stability of the hay bale feeder 10 when the enclosure 20 is on a ground 105 or other horizontal surface. When the hay bale feeder 10 is mounted on a vertical structure 120 such as a wall (see FIG. 7) the legs 90a, 90b can be brought together or removed.

The front trough section 24 and the rear trough section 26 are respectively configured to have floors formed by the first floor section 28a and by the second floor section 28b. The first floor section 28a and the second floor section 28b overlap and horizontally extend across the width of the enclosure 20. The first floor section 28a and the second floor section 28b angle upward and outward along their front and rear edges at approximately forty-five degree (45°) angles. The upward and outward angles helps retain hay 100 within the enclosure 20.

The first side panel 22a, the second side panel 22b, the front trough section 24, the rear trough section 26, the first floor section 28a, and the second floor section 28b are envisioned as comprised of corrosion-resistant sheet materials such as, but not limited to: steel, aluminum, extruded plastic or fiberglass, and the like. Additionally, suitable coatings, plating, paints, dyes and fillers can be used as. The first side panel 22a, the second side panel 22b, the front trough section 24, the rear trough section 26, the first floor section 28a, and the second floor section 28b preferably have all sharp edges covered with flexible channel-shaped safety edging 29 or similar materials to protect the animals during feeding. While sheet materials are preferred it should be understood that other types of materials and construction techniques can be used.

As noted above the hay bale feeder 10 includes legs 90a and 90b. Those legs are preferably "U"-shaped metal tubular legs that are affixed to the bottoms of the first floor section 28a and the second floor section 28b. The legs 90a, 90b are preferably affixed via integral perpendicular leg mounting plates 91. The leg mounting plates 91 are located at the tops of the legs 90a and 90b. The leg mounting plates 91, the first floor section 28a, and the second floor section 28b include apertures for receiving fasteners 74, such as nuts and bolts or the like which attach the leg mounting plates 91, and thus the legs 90a and 90b to the first floor section 28a and to the second floor section 28b. In practice, the legs 90a, 90b are angled outward to provide a stable foundation of the hay bale feeder 10.

Referring now to FIG. 1, the hay bale feeder 10 may be secured to the ground 105 or other floor surface by driving spikes 103 through leg apertures 102 that are formed or machined into each leg 90a, 90b. Referring now to FIG. 7, it is envisioned that in some applications a hay bale feeder 10 will be installed to a more or less vertical wall structure 120. It should also be understood that a hay bale feeder 10 may be used in conjunction with various large and small existing roofed shelters that provide protection from rain and similar elements. Attachment of the hay bale feeder 10 to a structure 120 is described in more detail subsequently.

Referring now to FIGS. 3 and 6, the hay bale feeder 10 includes a laterally extending spring winding mechanism 60 that is removably attached to a fencing attachment bar 92. The attachment bar 92 in turn is fixed to an edge of the chain link fencing 40. The shaft 62 can be spring-loaded so as to cause any slack in the fencing 40 to be taken up as the hay 100 is consumed. As the animals eat the hay 100 through the openings in the fencing 40 the spring winding mechanism 60 automatically winds up the fencing 40, thereby maintaining contact around the bale of hay 100 to minimize wasted feed.

One (1) edge of the fencing 40 is anchored to the rear frame 30 of the enclosure 20. The fencing 40 is clamped between a first clamping plate 42 and the inner surface of the rear frame 30 by a plurality of fasteners 74. The fencing 40 loops downward and forward and thus forms a forward edge that is affixed to a fencing attachment bar 92. The fencing attachment bar 92 supports attachment to the shaft 62 (see FIG. 6). The fencing 40 is beneficially saddle-shaped to contain and support a hay bale 100. Alternatively the fencing 40 may also be used to contain a quantity of hay in bulk form.

Figure 4A:
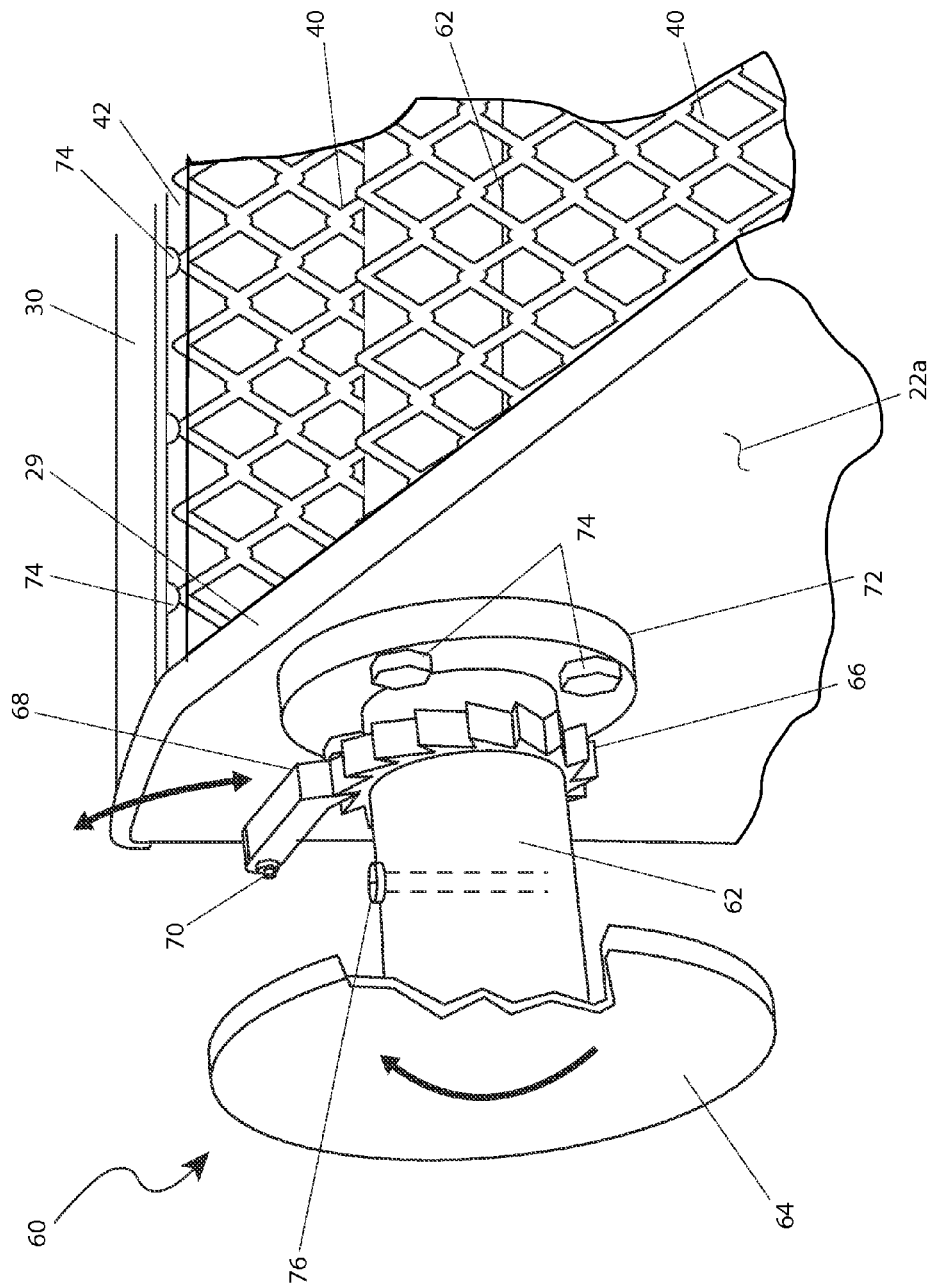
FIG. 4a is a close-up perspective view of a spring winding mechanism 60 used in the hay bale feeder 10 shown in FIGS. 1-3.
Figure 4B:
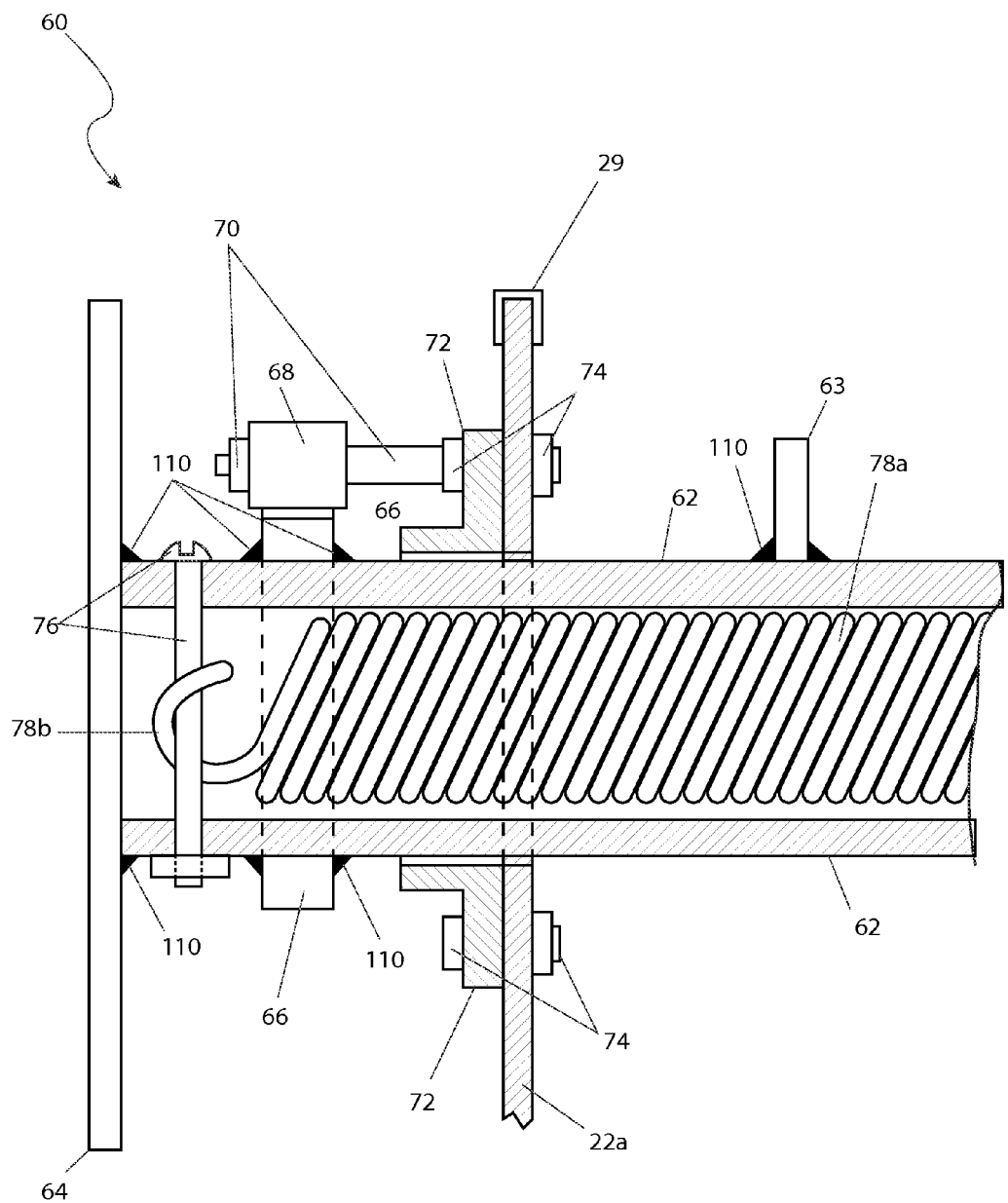

Refer now to FIGS. 4a, 4b, and 5 for perspective and cut-away views of the spring winding mechanism 60. The spring winding mechanism 60 includes the shaft 62 which extends between and is supported by upper portions of the first side panel 22a and second 22b side panel via respective first shaft flange 72 and second shaft flange 80. The shaft 62 is hollow and retains a torsion spring 78a.

The shaft 62 extends through both the first side panel 22a and the first shaft flange 72. That extended portion of the shaft 62 receives a hand wheel 64 that is approximately one (1) foot in diameter, a ratchet gear 66, and a first spring anchor bolt 76. The hand wheel 64 and the ratchet gear 66 are preferably affixed to the shaft 62 via welds 110.

The first spring anchor bolt 76 passes through the shaft 62 and engages a first hook-end 78b of the torsion spring 78a within the hollow shaft 62b. This provides a stop that allows wind up of the torsion spring 78a as the shaft 62 and first hook-end 78b are rotated as the hand wheel 64 is manually turned. At the other end of the spring 78a is a second hook-end 78c which is anchored in a non-rotating manner to the second shaft flange 80, see FIG. 5.

The ratchet gear 66 is a cylindrical gear with bias teeth. The ratchet gear 66 allows rotation of the shaft 62 in only one (1) direction (clockwise), thereby acting as a safety device when winding the torsion spring 78a and when unwinding the fencing 40 from the shaft 62. The ratchet gear 66 is mounted to the shaft 62 in a conventional manner, preferably by welds 110 adjacent to the first shaft flange 72. The ratchet gear 66 works in conjunction with a corresponding pawl arm 68 that engages the ratchet gear 66 to arrest wrong-direction rotary motion. This maintains torsional energy within the torsion spring 78a. The pawl arm 68 is mounted to an outer part of the first side panel 22a via a pivot bolt 70 or similar mechanism that allows the pawl arm 68 to swing away from the ratchet gear 66 when applying tension to the fencing 40.

The other end of the shaft 62 is inserted into a cylindrical recess 82 of the second shaft flange 80 such that the shaft 62 is free to rotate. The second shaft flange 80 is mounted to the second side panel 22b by a plurality of fasteners 74 such as bolts and nuts. The recess feature 82 is a cylindrical opening that is sized to receive the end of the shaft 62 and to act as a rotary bearing that enables smooth rotation of the shaft 62. The second shaft flange 80 further includes a second spring anchor bolt 84 that extends through the stationary second shaft flange 80 to engage the second hook-end 78c of the torsion spring 78a. This anchors the second hook-end 78c such that the second hook-end 78c does not non-rotate.

FIG. 6 presents a close-up view of the fencing attachment bar 92 and attached fencing 40. The shaft 62 enables removable attachment of the fencing attachment bar 92 via respective studs 63 and stud apertures 94. The shaft 62 has a plurality of equally-spaced studs 63 that are arranged in a single row along the shaft 62, preferably by welds 110 thereto. The fencing attachment bar 92 is attached to the top edge of the fencing 40. The fencing attachment bar 92 itself is beneficially a length of angle iron (or similar structural shape) having a row of stud apertures 94 arranged along the top to mate with the studs 63 of the shaft 62.

A side of the fencing attachment bar 92 includes a second clamping plate 93 attachment for holding the fencing 40 using a plurality of fasteners 74. The fasteners 74 pass through loop openings in the fencing 40 and then clamp the fencing 40 between the fencing attachment bar 92 and the second clamping plate 93. After loading a hay bale 100 into the hay bale feeder 10, the fencing attachment bar 92 is attached to the shaft 62 by inserting the studs 63 into respective stud apertures 94. The torsion spring 78a causes the shaft 62 to rotate to wind up the fencing 40.

FIG. 7 presents a sectional view of a hay bale feeder 10 configured for attachment to a structure 120. The hay bale feeder 10 is fixed to the structure 120, such as to the exterior or interior wall support beams. As shown the rear trough section 26 is configured to contact the structure 120 and the leg assemblies 90a, 90b are removed (optional). The rear frame 30 and the fasteners 74 are used to provide secure attachment of the hay bale feeder 10 to the structure 120.

The preferred embodiment of the present invention can be utilized by the common user in a simple and effortless manner with little or no training. After initial purchase or acquisition of the hay bale feeder 10, it would be set up or installed as indicated in FIG. 1 or 7.

The method of installing and initially loading hay 100 into the hay bale feeder 10 may be achieved by; procuring a hay bale feeder 10; placing the hay bale feeder 10 on a generally flat ground 105 or other surface; extending the fencing 40 forward and out of the enclosure 20; pivoting the pawl arm 68 forward to engage the ratchet gear 66 to prevent the shaft 62 from rotating in a reverse direction; turning the hand wheel 64 in to load the torsion spring 78a to impart a torque upon the shaft 62; loading the hay bale feeder 10 by placing a hay bale 100 within the enclosure 20; cutting and removing any twine or other packaging materials from the hay bale 100; pulling the fencing 40 up and over the hay bale 100; lining up the stud apertures 94 in the fencing attachment bar 92 with the studs 63 on the shaft 62; inserting the studs 63 into the stud apertures 94; turning the hand wheel 64 slightly to disengage the pawl arm 68 from the ratchet gear 66; pivoting the pawl arm 64 out and away from the ratchet gear 66; allowing the hand wheel 64 to turn to pull the fencing 40 against the hay bale 100; and, allowing the fencing 40 to automatically wind up around the shaft 62 until all the hay 100 is consumed.

The method of loading a subsequent bale of hay 100 into the hay bale feeder 10 may be achieved by: pivoting the pawl arm 68 forwardly until engaged with the ratchet gear 66; turning the hand wheel 64 to unwind the fencing 40 from the shaft 62; removing the fencing attachment bar 92 from the shaft 62 by disengaging the stud apertures 94 from the studs 63 and lifting the fencing attachment bar 92 off; placing a hay bale 100 into the enclosure 20; cutting and removing any twine or other packaging materials from the hay bale 100; reinstalling the fencing attachment bar 92 to the fencing 40 by engaging the stud 63 and stud aperture 94; turning the hand wheel 64 to disengage the pawl arm 68 from the ratchet gear 66; and, allowing the torque within the torsion spring 78a to rotate the hand wheel 64 to apply tension to the fencing 40 to pull it tight against the new hay bale 100.

In use, as the animal eats the hay 100 through the openings in the fencing 40 the fencing 40 automatically winds up onto the shaft 62 to reduce the amount of hay from the hay bale 100 dropping on the ground 105 and being wasted.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A hay bale feeder, comprising:
    an enclosure having a first side panel, a second side panel, an open front trough section, a first floor attached to the bottom of said front trough section, an open rear trough section, a second floor attached to the bottom of said rear trough section, wherein said first side panel and said second side panel are joined at their bottoms to said first floor, wherein said second trough section is connected to said first side panel and to said second side panel, and wherein an extension of said rear trough section from said first side panel and said second side panel is adjustable;
    an elongated rear frame member joined to upper rear corners of said first side panel and said second side panel;
    a first support tube extending between and connecting said first side panel to said second side panel, said first support tube positioned slightly above said first floor section and towards the front of said enclosure;
    a second support tube extending between and connecting said first side panel to said second side panel, said second support tube positioned slightly above said first floor section and towards the rear of said enclosure;
    a laterally extending spring winding mechanism having a hollow shaft with a first shaft end supported by a first shaft flange attached to said first side panel and a second shaft end supported by a second shaft flange fixed on said second side panel, said spring winding mechanism further including a torsion spring having a first hook end and a second hook end, said spring extending within said shaft;
    a hand wheel and a ratchet gear attached to said first shaft end;
    a first hook fastener fixing said first hook end to said shaft;
    a second hook fastener fixing said second hook end to said second shaft flange;
    a gear pawl selectively matting to said ratchet gear to enable said shaft to selectively turn in only one direction; and,
    chain link fencing fixed at one end to said elongated rear frame member and selectively attached to said shaft at another end.

2. The hay bale feeder according to claim 1, wherein said first side panel and said second side panel are welded to said first floor.

3. The hay bale feeder according to claim 1, wherein said rear frame member is angle iron.

4. The hay bale feeder according to claim 1, wherein said first side panel and second side panel include sets of apertures, wherein said rear trough section includes a set of apertures, and wherein said extension is adjusted by aligning said set of apertures in said rear trough section with a selected set of apertures and then passing and tightening fasteners through said aligned apertures.

5. The hay bale feeder according to claim 1, further including safety edging on at least one sharp edge.

6. The hay bale feeder according to claim 1, further including legs extending from said first floor and from said second floor.

7. The hay bale feeder according to claim 6, wherein said legs are "U"-shaped tubes.

8. The hay bale feeder according to claim 6, wherein said legs include leg apertures, and wherein spikes are driving through said leg apertures.

9. The hay bale feeder according to claim 6, wherein said legs are removable.

10. The hay bale feeder according to claim 1, wherein said chain link fencing is fixed at one end to said elongated rear frame member by pinching said one end between said elongated rear frame member and an attachment bar.

11. The hay bale feeder according to claim 10, wherein said chain link fencing is pinched using threaded fasteners passed through said elongated rear frame member, fence openings, and said attachment bar.

12. The hay bale feeder according to claim 1, wherein selectively attaching said chain link fencing to said shaft is performed by pinching said chain link fencing between a second clamping plate and a fencing attachment bar and attaching said fencing attachment bar to said shaft.

13. The hay bale feeder according to claim 12, wherein said chain link fencing is pinched using threaded fasteners that pass through said second clamping plate, fence openings, and said fencing attachment bar.

14. The hay bale feeder according to claim 13, wherein said fencing attachment bar includes a plurality of apertures, wherein said shaft includes a plurality of studs, and wherein said fencing attachment bar is attached to said shaft by inserting said plurality of studs through said plurality of apertures.

15. The hay bale feeder according to claim 14, wherein said fencing attachment bar is angle iron.

16. The hay bale feeder according to claim 1, wherein said hand wheel is approximately 1 foot in diameter.

17. The hay bale feeder according to claim 1, wherein said hand wheel is outside of said enclosure.

18. The hay bale feeder according to claim 1, further including a bale of hay inside said enclosure.

19. The hay bale feeder according to claim 18, wherein said bale of hay rests on said first support tube.

20. The hay bale feeder according to claim 18, wherein hay extends through said chain link fence.

\* \* \* \* \*